May 7, 1929.  E. M. STALLARD ET AL  1,711,861
NUT LOCK
Filed June 30, 1928
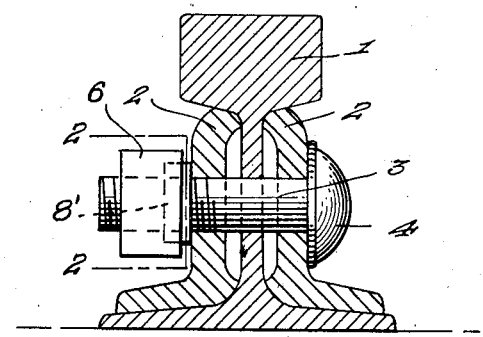
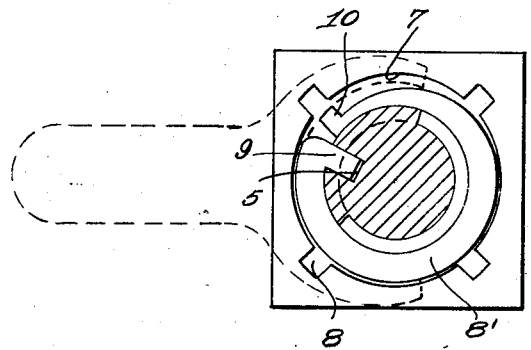
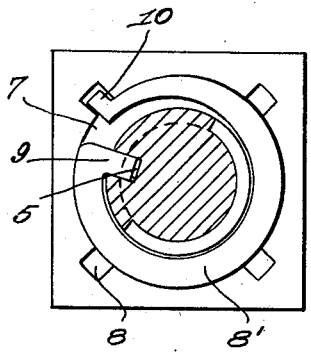
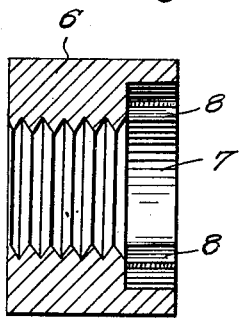
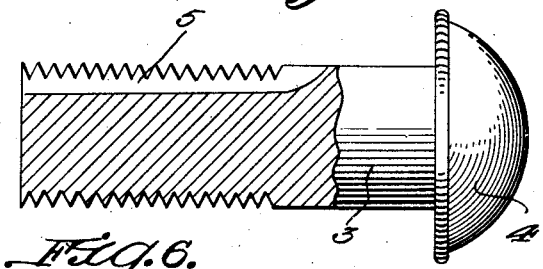
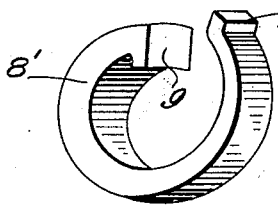
Elgin M. Stallard,
Frank B. Hale, INVENTOR
BY Victor J. Evans
ATTORNEY Patented May 7, 1929.

1,711,861

UNITED STATES PATENT OFFICE.

ELGIN M. STALLARD AND FRANK B. HALE, OF FORT WORTH, TEXAS.

NUT LOCK.

Application filed June 30, 1928. Serial No. 289,538.

Our present invention has reference to a simple, cheaply constructed but thoroughly effective means for locking a nut on a bolt, in a manner which will permit of the removal of the nut from the bolt when occasion requires.

To the attainment of the foregoing the invention consists in the improvement as hereinafter described and definitely claimed.

In the drawings:

Figure 1 is a cross sectional view through a rail and fish plates therefor, illustrating the application of our improvement thereon.

Figure 2 is a sectional view approximately on the line 2—2 of Figure 1.

Figure 3 is a view substantially similar to Figure 2 but illustrating a manner in which the spring lock washer of the nut is compressed to permit of the nut being screwed off of the bolt.

Figure 4 is an approximately central longitudinal sectional view through the nut.

Figure 5 is a side elevation of the bolt with parts in section.

Figure 6 is a perspective view of the locking member.

Our improvement is especially adaptable for locking the nuts on bolts that connect the fish plates to rails at the meeting ends of such rails and has been so illustrated by Fig. 1 of the drawings. The improvement, however, is not to be thus restricted in its useful capacity as the same may be successfully employed in other connections.

Referring now to the drawings and to Figure 1 in particular, the numeral 1 designates a railway rail and 2 the fish plates which are arranged in the fishing spaces in the sides of the rail. Passing through the fishing plates 2 and through the web of the rail there is the shank 3 of a headed bolt 4. This shank has its threaded portion provided with a longitudinally extending groove 5.

There is screwed on the bolt 4 a nut 6 of the usual construction. This nut, however, has its inner face provided with a round pocket 7, and is likewise provided with spaced notches 8 that communicate with the pocket. Before the nut is screwed on the bolt I arrange thereon a split spring ring 8' which is of spiral formation. The inner and thickened end of the ring 8' is formed with an inwardly extending lug 9 and the outer and reduced end of the said ring is formed with an outwardly extending lug 10. The lug 9 is designed to be received in the groove 5 of the bolt 4 and the lug 10 is designed to be received in any one of the notches 8 in the pocket 7 of the nut 6. The locking element 8' is of a materially greater width than the depth of the pocket 7, so that a spanner wrench, such as disclosed by the dotted lines in Figure 3 of the drawings will engage with the comparatively thin outer end of the split locking ring 8' to compress the ring and to bring the lug 10 thereon into one of the notches 8. In a like manner the spanner wrench, indicated for distinction by the numeral 11, is employed for compressing the reduced end of the locking ring to bring the lug 10 out of the pocket 8 and to permit of another wrench being employed for unscrewing the nut from the bolt.

The simplicity and advantages of the construction will, it is thought, be understood and appreciated without further detailed description.

Having described the invention, we claim:

A means for locking a nut on a bolt, comprising in combination, a bolt having its shank formed with a longitudinal groove, a nut to be screwed on the bolt and having a round pocket on its inner face, and being provided with spaced notches which communicate with the pocket, a split spring ring of spiral formation, reduced in thickness from its inner to its outer end, and of a width greater than the depth of the pocket and designed to be received in said pocket, said ring having its inner end formed with a lug to be received in the groove of the bolt and its outer end also formed with a lug to be received in one of the notches in the nut.

In testimony whereof we affix our signatures.

ELGIN M. STALLARD.
FRANK B. HALE.